(12) United States Patent
Bernreitner et al.

(10) Patent No.: US 8,709,561 B2
(45) Date of Patent: Apr. 29, 2014

(54) POLYPROPYLENE BOTTLES

(75) Inventors: Klaus Bernreitner, Linz (AT); Petar Doshev, Linz (AT)

(73) Assignee: Borealis AG, Vienna (AT)

(*) Notice: Subject to any disclaimer, the term of this patent is extended or adjusted under 35 U.S.C. 154(b) by 0 days.

(21) Appl. No.: 13/642,007

(22) PCT Filed: Apr. 15, 2011

(86) PCT No.: PCT/EP2011/056001
§ 371 (c)(1),
(2), (4) Date: May 22, 2013

(87) PCT Pub. No.: WO2011/131578
PCT Pub. Date: Oct. 27, 2011

(65) Prior Publication Data
US 2013/0236668 A1 Sep. 12, 2013

(30) Foreign Application Priority Data
Apr. 20, 2010 (EP) .................................. 10160474

(51) Int. Cl.
*B29D 22/00* (2006.01)
*B29D 23/00* (2006.01)
*B32B 1/08* (2006.01)

(52) U.S. Cl.
USPC .......... 428/35.7; 525/297; 525/322; 524/284; 524/417; 524/145; 524/108

(58) Field of Classification Search
USPC .......... 428/35.7; 525/297, 322; 524/284, 417, 524/145, 108
See application file for complete search history.

(56) References Cited

U.S. PATENT DOCUMENTS 5,234,879 A  8/1993  Garoff et al.

FOREIGN PATENT DOCUMENTS

| CN | 101175810 A | 5/2008 |
|---|---|---|
| CN | 102203179 A | 9/2011 |
| EP | 0316187 A2 | 5/1989 |
| EP | 0879830 A1 | 11/1998 |
| EP | 0887379 A1 | 12/1998 |
| EP | 0890612 A2 | 1/1999 |
| EP | 1270628 A1 | 1/2003 |
| EP | 1270651 A1 | 1/2003 |
| WO | 9212182 A1 | 7/1992 |
| WO | 9219653 A1 | 11/1992 |
| WO | 9219658 A1 | 11/1992 |
| WO | 9924478 A1 | 5/1999 |

(Continued)

OTHER PUBLICATIONS

International Search Report and Written Opinion for International Application No. PCT/EP2011/056001 Filed on Apr. 15, 2011.

(Continued)

*Primary Examiner* — Michael C Miggins
(74) *Attorney, Agent, or Firm* — Warn Partners, P.C.

(57) ABSTRACT

A polypropylene composition having a melt flow rate $MFR_2$ (230° C.) measured according to according to ISO 1133 of at least 2.0 g/10 min, said polypropylene composition comprises a propylene copolymer (C-PP) and a high melt strength polypropylene (HMS-PP), wherein the propylene copolymer (C-PP) (a) has a comonomer content of equal or below 7.0 wt.-%, the comonmers are ethylene and/or at least one $C_4$ to $C_{12}$ α-olefin, and (b) fulfills the equation (I) $R+4.96 \times C \leq 95.66$ wherein R is the randomness [%] measured by Fourier transform infrared spectroscopy (FTIR), and C is the comonomer content [wt.-%] measured by Fourier transform infrared spectroscopy (FTIR).

18 Claims, 1 Drawing Sheet

(56) References Cited

FOREIGN PATENT DOCUMENTS

| WO | 9924479 | A1 | 5/1999 |
| WO | 9933843 | A1 | 7/1999 |
| WO | 0068315 | A1 | 11/2000 |

OTHER PUBLICATIONS

Gachter/Muller, Plastics Additivies Handbook 3rd Edition, 1993, pp. 870-873, Hansa Publishers, Munich.

Tetsuo Hayashi, Yoshio Inoue, Riichiro Chujo & Tetsuo Asakura, Heptad configurational analysis of 13C n.m.r. spectra in highly isotactic polypropylene, Jan. 1998, pp. 138-143, vol. 29, Polymer, Butterworth & Co. (Publishers) Ltd.

Riichiro Chujo, Yoshiaki Kogure & Taito Vaananen, Two-site model analysis of 13C n.m.r. of polypropylene polymerized by Ziegler-Natta catalyst with external alkoxysilane donors, 1994, pp. 339-342, vol. 35, No. 2, Polymer, Butterworth-Heinemann Ltd.

M. H. Wagner, V. Schulze & A. Gottfert, Rheotens-Mastercurves and Drawability of Polymer Melts, Apr. 1996, pp. 925-935, vol. 36, No. 7, Polymer Engineering and Science.

Bruno H. Zimm & Walter H. Stockmayer, The Dimensions of Chain Molecules Containing Branches and Rings, Dec. 1949, pp. 1301-1314, vol. 17, No. 12, The Journal of Chemical Physics, The British Library.

Herausgegeben Von U. Gruber & W. Klein, Die Praxis der instrumentellen Analytik, & Stavros Kromidas, Validierung in der Analytik, 1997, C-NMR Literature, Wiley-VCH, Weinheim.

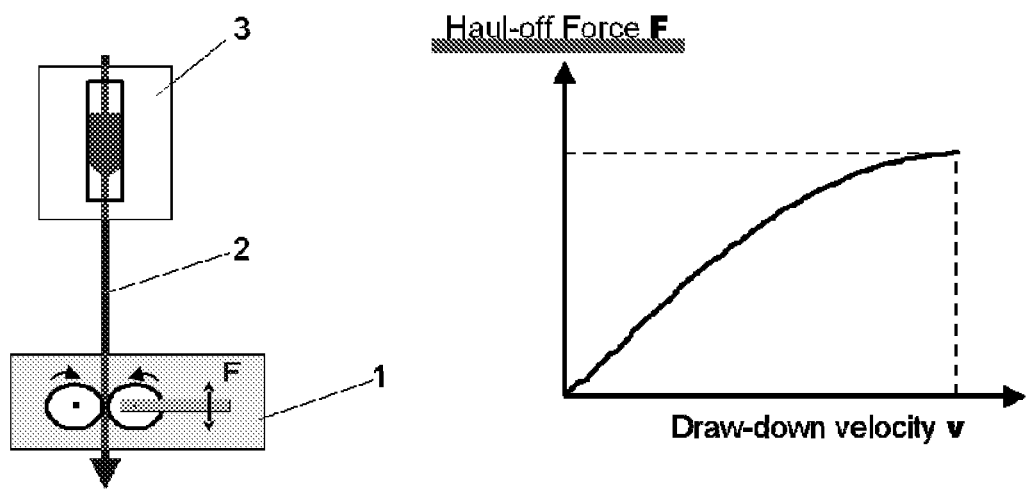

POLYPROPYLENE BOTTLES

CROSS REFERENCE TO RELATED APPLICATIONS

This application is a National Stage of International Application No. PCT/EP2011/056001, filed Apr. 15, 2011. This application claims priority to European Patent Application No. 10160474.2, filed Apr. 20, 2010. The disclosures of the above applications are incorporated herein by reference.

The present invention is directed to a new polypropylene composition suitable for the preparation of articles, like bottles, as well as to articles, i.e. bottles, made from the new polypropylene composition.

It is well known in the polymer field that different applications require specifically tailored polymers to achieve the individual demanding properties. For instance a polymer used for injection molding must necessarily have other properties as a polymer used for blow molding.

The extrusion blow molding process for instance is a very special process that allows in a flexible and cheap way the preparation of different kind of bottles with respect to size and shape. Main drawback in this process is that the solidification step is very special compared to normal injection molding.

In the extrusion blow molding process a polymer melt is first extruded through a tubular die into air forming a polymer tube, subsequently blowing up said polymer tube (typically called "parison" in this technical field) until the outside of the tube reaches the boundaries of the mold. To cover the wall of the mold fully with the blown up polymer tube is rather difficult compared to injection molding because the air between polymer tube and mold has to be removed totally which is a demanding process step. Further the inside of the polymer tube is not in contact with the mold and therefore there is only little possibility to influence the inner surface structure of the tube. As a consequence thereof extrusion blown molded articles, like bottles, normally show less gloss and transparency compared to any injection molded articles. For instance, the surface property inside and/or outside of extrusion blown bottles is typically non-uniform (flow lines, melt fracture) leading to lower overall gloss and transparency compared to injection molded bottles or injection stretched blown molded articles (ISBM). A certain improvement of the transparency can be achieved by visbreaking the polymer material but this concept has quite some limitation and is normally applied for relatively small bottles. Accordingly bigger bottles (volume of 1l or more) are preferably not producible with visbroken polypropylene in an extrusion blow molding process.

Beside gloss also impact is very important for the performance of a bottle. Higher impact reduces the risk of damages during transport of a bottle and is also important for the handling. The impact of bottles is reflected by the so called drop test.

Good stiffness performance is also required. However, normally materials with superior stiffness suffer from a loss in impact.

Thus the object of the present invention is to provide a polypropylene composition which enables inter alia the preparation of bottles by an extrusion blow molding process, wherein the bottles are featured by high gloss, high impact and optionally good stiffness behavior. Also processability of the polypropylene should be enhanced compared to known standard polypropylenes.

The finding of the present invention is that a random polypropylene must be combined with a branched polypropylene, like a Y/H-shaped polypropylene, i.e. a high melt strength polypropylene (HMS-PP) and an α-nucleating agent.

Accordingly the present invention is directed in a first aspect to a polypropylene composition having a melt flow rate $MFR_2$ (230° C.) measured according to ISO 1133 of at least 2.0 g/10 min, said polypropylene composition comprises a propylene copolymer (C-PP), a high melt strength polypropylene (HMS-PP), and an α-nucleating agent (N), wherein the propylene copolymer (C-PP)

(a) has a comonomer content of equal or below 7.0 wt.-%, the comonomers are ethylene and/or at least one $C_4$ to $C_{12}$ α-olefin, (b) comprises two propylene copolymer fractions (A) and (B), wherein the comonomer content of the first propylene copolymer fraction (A) is in the range of 1.0 to 4.5 wt.-% and the comonomer content of the first propylene copolymer fraction (A) is lower compared to the comonomer content of the second propylene copolymer fraction (B).

Preferably the propylene copolymer (C-PP) according to the first aspect fulfills the equation (I)

$$R+4.96 \times C \leq 95.66 \qquad (I)$$

wherein
R is the randomness [%] measured by Fourier transform infrared spectroscopy (FTIR), and
C is the comonomer content [wt.-%] measured by Fourier transform infrared spectroscopy (FTIR).

In a second aspect the present invention is directed to a polypropylene composition having a melt flow rate $MFR_2$ (230° C.) measured according to ISO 1133 of at least 2.0 g/10 min, said polypropylene composition comprises a propylene copolymer (C-PP), a high melt strength polypropylene (HMS-PP), and an α-nucleating agent (N), wherein the propylene copolymer (C-PP)

(a) has a comonomer content of equal or below 7.0 wt.-%, the comonomers are ethylene and/or at least one $C_4$ to $C_{12}$ α-olefin, and (b) fulfills the equation (I)

$$R+4.96 \times C \leq 95.66 \qquad (I)$$

wherein
R is the randomness [%] measured by Fourier transform infrared spectroscopy (FTIR), and
C is the comonomer content [wt.-%] measured by Fourier transform infrared spectroscopy (FTIR).

Preferably the propylene copolymer (C-PP) according to the second aspect comprises two propylene copolymer fractions (A) and (B), wherein the comonomer content of the first propylene copolymer fraction (A) is in the range of 1.0 to 4.5 wt.-% and the comonomer content of the first propylene copolymer fraction (A) is lower compared to the comonomer content of the second propylene copolymer fraction (B).

The polypropylene composition according to the first or second aspect preferably comprises as polymer components only the propylene copolymer (C-PP) and the high melt strength polypropylene (HMS-PP) as defined above and in further detail below.

It has been surprisingly found out that such a polypropylene composition has superior properties compared to known polypropylene compositions, in particular to those normally used for extrusion blown molding processes. The polypropylene composition of the present invention enables in particular to produce extrusion blown bottles with high gloss, exceptional impact according to the drop test and good stiffness.

Also the processability is improved due to the higher melt flow rate in view of the comparative examples (see experimental part).

In the following the present invention is described in more detail. Thereby the preferred embodiments discussed below refer to the first and second aspect as defined above.

One essential requirement of the inventive polypropylene composition is its increased melt flow rate. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, it is preferred that the inventive polypropylene composition has an $MFR_2$ (230° C.) of at least 2.0 g/10 min, more preferably of at least 2.2 g/10 min. Accordingly it is in particular appreciated that the inventive polypropylene composition has an $MFR_2$ (230° C.) in the range of 2.0 to 6.0 g/10 min, more preferably of 2.1 to 4.5 g/10 min, still more preferably of 2.2 to 3.8 g/10 min.

Further, as stated above the new polypropylene composition must comprise a high melt strength polypropylene (HMS-PP). Such polymer types improve the melt strength of the polypropylene composition. Accordingly it is preferred that the polypropylene composition is further characterized by a strain hardening behavior with a haul-off force $F_{max}$ as determined in the Rheotens at 200° C. of at least 7.0 cN and a draw down velocity $v_{max}$ of at least 180 mm/s, more preferably by a strain hardening behavior with a haul-off force $F_{max}$ of at least 7.5 cN and a draw down velocity $v_{max}$ of at least 185 mm/s.

Further the polypropylene composition can be additionally defined by the gel content. The gel content is a good indicator for the chemical modification of the polypropylene composition or its components. Accordingly the present invention is featured by relatively moderate gel content, i.e. of not more than 1.00 wt.-%, even more preferred of not more than 0.80 wt.-%, still more preferred of not more than 0.50 wt.-% determined as the relative amount of polymer insoluble in boiling xylene (xylene hot insoluble fraction, XHI). On the other hand the polypropylene composition must comprise a certain amount of high melt strength polypropylene (HMS-PP). Accordingly the amount of gel content in the polypropylene composition is preferably more than 0.15 wt.-%, more preferably of at least 0.27 wt.-%. Thus a preferred range for the gel content of the polypropylene composition is 0.05 to 0.90 wt.-%, like 0.15 to 0.90 wt.-%, more preferred 0.26 to 0.8 wt.-%.

Further it is appreciated that the present polypropylene composition has preferably a xylene cold soluble fraction (XCS) of not more than 15.0 wt-%, more preferably of not more than 14.0 wt.-%, yet more preferably of not more than 12.0 wt.-%, like not more than 11.5 wt.-%.

Further the polypropylene composition can be specified by the amount of comonomer units other than propylene within the polypropylene composition. Accordingly it is appreciated that the amount of units derived from $C_2$ to $C_{12}$ α-olefins other than propylene is not more than 7.0 wt.-%, preferably not more than 6.0 wt.-%, like not more than 5.5 wt.-%, in the polypropylene composition.

In the following the present polypropylene composition is further defined by the polymer components within the composition.

The propylene copolymer (C-PP) comprises units derived from propylene and at least another $C_2$ to $C_{12}$ α-olefin, preferably at least another $C_2$ to $C_{10}$ α-olefin. Accordingly the propylene copolymer (C-PP) comprises units derived from propylene and at least another α-olefin selected from the group consisting of ethylene $C_4$ α-olefin, $C_5$ α-olefin, $C_6$ α-olefin, $C_7$ α-olefin, $C_8$ α-olefin, $C_9$ α-olefin and $C_{10}$ α-olefin. More preferably the propylene copolymer (C-PP) comprises units derived from propylene and at least another α-olefin selected from the group consisting of ethylene, 1-butene, 1-pentene, 1-hexene, 1-heptene, 1-octene, 1-nonene and 1-decene, wherein ethylene, 1-butene and 1-hexene are preferred. It is in particular preferred that the propylene copolymer (C-PP) consists of units derived from propylene and ethylene. The amount of units derived from $C_2$ to $C_{12}$ α-olefins other than propylene in the propylene copolymer (C-PP) is equal or below 7.0 wt.-%, preferably in the range of 1.0 to 7.0 wt.-%, more preferably 1.5 to 6.0 wt.-%, still more preferably 2.0 to 5.5 wt.-%.

Preferably the propylene copolymer (C-PP) is a random propylene copolymer. The term random is understood according to IUPAC (Glossary of basic terms in polymer science; IUPAC recommendations 1996). Accordingly it is preferred that the propylene copolymer (C-PP) has a randomness of at least 40%, more preferably of at least 50%, yet more preferably at least 55%, even more preferably of at least 60%, and still more preferably of at least 65%.

Even more preferably the propylene copolymer (C-PP) fulfills the equation (I), yet more preferably fulfills the equation (Ia), yet more preferably fulfills the equation (Ib), $$R+4.96 \times C \leq 95.66 \quad (I)$$

$$R+4.30 \times C \leq 94.66 \quad (Ia)$$

$$R+4.30 \times C \leq 93.66 \quad (Ib)$$

wherein
R is the randomness [%] measured by Fourier transform infrared spectroscopy (FTIR), and
C is the comonomer content [wt.-%] measured by Fourier transform infrared spectroscopy (FTIR).

Preferably the propylene copolymer (C-PP) is isotactic. Accordingly it is appreciated that propylene copolymer (C-PP) has a rather high isotactic triad concentration, i.e. higher than 90%, more preferably higher than 92%, still more preferably higher than 93% and yet more preferably higher than 95%, like higher than 97%.

Further it is appreciated that the xylene soluble content of the propylene copolymer (C-PP) is a rather low. Accordingly the propylene copolymer (C-PP) has preferably a xylene cold soluble fraction (XCS) measured according to ISO 6427 (23° C.) of not more than 15.0 wt-%, more preferably of not more than 13.0 wt.-%, yet more preferably of not more than 12.0 wt.-%, like not more than 11.5 wt.-%. Thus a preferred range is 1.0 to 15.0 wt.-%, more preferred 1.0 to 13.0 wt.-%, still more preferred 1.2 to 11.0 wt.-%.

Preferably the propylene copolymer (C-PP) is multimodal, like bimodal in view of the molecular weight distribution and/or the comonomer content distribution, the latter especially preferred.

The expression "multimodal" or "bimodal" used herein refers to the modality of the polymer, i.e.
the form of its molecular weight distribution curve, which is the graph of the molecular weight fraction as a function of its molecular weight, or more preferably the form of its comonomer content distribution curve, which is the graph of the comonomer content as a function of the molecular weight of the polymer fractions.

As will be explained below, the polymer fractions of the propylene copolymer (C-PP) can be produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly the propylene copolymer (C-PP) may be multimodal, like bimodal, in view of the comonomer content and/or molecular weight. It is in particular appreciated that the propylene copolymer (C-PP) is multimodal, like bimodal, in view of the comonomer content.

Further in case the propylene copolymer (C-PP) is of multimodal, like bimodal, character, in particular multimodal, like bimodal, in view of the comonomer content, it is appreciated that the individual fractions are present in amounts influencing the properties of the material. Accordingly it is appreciated that each of these fractions is at least present in the amount of 10 wt.-% based on the propylene copolymer (C-PP). Accordingly in case of a bimodal system, in particular in view of the comonomer content, the split of the two fractions is preferably 40:60 to 60:40.

Thus in one preferred embodiment the propylene copolymer (C-PP) comprises at least, preferably consists of, two propylene copolymer fractions (A) and (B) which differ in their comonomer content, like ethylene content (preferably as the only comonomer in the propylene copolymer (C-PP)), wherein the first propylene copolymer fraction (A) is present from 40 to 60 wt.-% and the second propylene copolymer fraction (B) from 60 to 40 wt.-% (40:60 to 60:40). Accordingly both propylene copolymer fractions (A) and (B) comprise, preferably consists of, units derived from propylene and at least another $C_2$ to $C_{12}$ α-olefin, preferably at least another $C_2$ to $C_{10}$ α-olefin. Accordingly the two propylene copolymer fractions (A) and (B) comprise, preferably consist of, units derived from propylene and at least another α-olefin selected from the group consisting of ethylene, $C_4$ α-olefin, $C_5$ α-olefin, $C_6$ α-olefin, $C_7$ α-olefin, $C_8$ α-olefin, $C_9$ α-olefin and $C_{10}$ α-olefin. More preferably the two propylene copolymer fractions (A) and (B) comprise, preferably consist of, units derived from propylene and at least another α-olefin selected from the group consisting of ethylene, 1-butene, 1-pentene, 1-hexene, 1-heptene, 1-octene, 1-nonene and 1-decene, wherein ethylene, 1-butene and 1-hexene are preferred. It is in particular preferred that the two propylene copolymer fractions (A) and (B) consist of units derived from propylene and ethylene. It is especially preferred that the comonomers within the two propylene copolymer fractions (A) and (B) are the same. Accordingly in one specific embodiment the propylene copolymer (C-PP) comprises, preferably consists of, the two propylene copolymer fractions (A) and (B), wherein the two propylene copolymer fractions (A) and (B) have the same comonomers like ethylene, i.e. the propylene copolymer fractions (A) and (B) consist of units dervaible from propylene and ethylene only.

As stated above both fractions (A) and (B) are propylene copolymers. Preferably the comonomer content of the first propylene copolymer fraction (A) is in the range of 1.0 to 4.5 wt.-%, more preferably is in the range of 1.5 to 3.5 wt.-%, like 1.8 to 3.2 wt.-%.

Further it is appreciated that additionally or alternatively to the requirement of the previous paragraph the comonomer content of the first propylene copolymer fraction (A) is lower compared to the comonomer content of the second propylene copolymer fraction (B). Thus it is especially appreciated that the comonomer content, like ethylene content, of the second propylene copolymer fraction (B) is at least 1.0 wt.-%, more preferably at least 1.5 wt.-%, yet more preferably at least 2.0 wt.-%, higher than the comonomer content, like ethylene content, of the first propylene copolymer fraction (A). On the other hand the difference in the comonomer content between the two fractions should be not too high, i.e. not higher than 6.0 wt.-%, preferably not higher than 5.0 wt %, more preferably not higher than 4.7 wt.-%, to avoid any separation tendencies. Thus it is appreciated that the comonomer content, like ethylene content, of the second propylene copolymer fraction (B) is preferably 1.0 to 7.0 wt.-%, more preferably of 1.2 to 7.0 wt.-% higher than the comonomer content, like ethylene content, of the first propylene copolymer fraction (A). Accordingly it is preferred that the second propylene copolymer fraction (B) has comonomer content, like ethylene content, of at least 3.0 wt.-%, more preferably of at least 4.0 wt.-%, like at least 5.0 wt.-%, yet more preferably in the range of 3.0 to 10.0 wt.-%, like 3.0 to 9.0 wt.-%, still more preferably in the range of 4.0 to 8.5 wt.-%

Further it is appreciated that the propylene copolymer (C-PP) has a rather high crystallization temperature Tc measured by differential scanning calorimetry (DSC) of at least 110° C., even more preferably of at least 115° C. Preferably this crystallization temperature Tc is measured before degradation of the polypropylene composition and thus before degradation of the propylene copolymer (C-PP). Preferably the propylene copolymer (C-PP) is α-nucleated, i.e. comprises the α-nucleating agent (N) as defined in detail below.

As stated above, the inventive polypropylene composition must at least comprise—as polymer components—a propylene copolymer (C-PP) and a high melt strength polypropylene (HMS-PP). The two components must be chosen in such a way that in particular the required $MFR_2$ (230° C.) of at least 2.0 g/10 min for the final polypropylene composition is met. In principle three options are possible to achieve the desired rather high melt flow rate for the final composition. First one uses a propylene copolymer (C-PP) with an $MFR_2$ (230° C.) similar to the final product and mixes it with the high melt strength polypropylene (HMS-PP). An alternative route is to take a propylene copolymer (C-PP) having a significantly lower $MFR_2$ (230° C.) compared to the final product, degrading said propylene copolymer (C-PP), i.e. visbreaking, said propylene copolymer (C-PP), and subsequently mixing it with the high melt strength polypropylene (HMS-PP). A further option is to use a mixture of a propylene copolymer (C-PP) and the high melt strength polypropylene (HMS-PP) (optionally with the α-nucleating agent (N)), wherein said propylene copolymer (C-PP) has a significantly lower $MFR_2$ (230° C.) compared to the final product. Said mixture is visbroken by using peroxide to the required $MFR_2$ (230° C.) of at least 2.0 g/10 min for the final polypropylene composition. The latter option is the most preferred.

Accordingly, considering the different options to create a polypropylene composition with an $MFR_2$ (230° C.) of at least 2.0 g/10 min, the propylene copolymer (C-PP) within the polypropylene composition has preferably an $MFR_2$ (230° C.) of not more than 4.5 g/10 min.

More preferably the propylene copolymer (C-PP) within the polypropylene composition has an $MFR_2$ (230° C.) of not more than 3.0 g/10 min. Accordingly it is in particular appreciated that the propylene copolymer (C-PP) within the polypropylene composition has an $MFR_2$ (230° C.) in the range of 2.0 to 4.5 g/10 min, more preferably of 2.1 to 3.8 g/10 min, still more preferably of 2.2 to 3.5 g/10 min.

In case the inventive polypropylene composition is obtained by visbreaking the propylene copolymer (C-PP) or by visbreaking the polypropylene composition, the used propylene copolymer (C-PP) has an $MFR_2$ (230° C.) of at least 0.3 g/10 min, more preferably in the range of 0.5 to 3.0 g/10 min, yet more preferably of 1.0 to 2.5 g/10 min, like 1.3 to 2.0 g/10 min. Preferably the initially used propylene copolymer (C-PP) is chosen in such a manner that the visbreaking ratio (final $MFR_2$ (230° C.)/initial $MFR_2$ (230° C.)) is 1.3 to 3.0, more preferably 1.4 to 2.5, wherein "initial $MFR_2$ (230° C.)" is the $MFR_2$ (230° C.) of the propylene copolymer (C-PP) before visbreaking and "final $MFR_2$ (230° C.)" is the $MFR_2$ (230° C.) of the propylene copolymer (C-PP) after visbreaking and/or the $MFR_2$ (230° C.) of the polypropylene composition after visbreaking.

The preparation of the propylene copolymer (C-PP) as well as the visbreaking will be defined in more detail below.

As a further essential requirement of the present invention a high melt strength polypropylene (HMS-PP) must be used. Such polymer types are characterized by a certain degree of branching. Possible high melt strength polypropylenes (HMS-PP) are so called Y/H-polypropylenes and for instance described in EP 0 787 750, i.e. single branched polypropylene types (Y polypropylenes having a backbone with a single long side-chain and an architecture resembles a "Y") and polypropylene types in which polymer chains are coupled with a bridging group (an architecture resembles a "H"). Such polypropylenes are characterized by rather high melt strength. A parameter of the degree of branching is the branching index g'. The branching index g' correlates with the amount of branches of a polymer. The branching index g' is defined as $g'=[IV]_{br}/[IV]_{lin}$, in which g' is the branching index, $[IV]_{br}$ is the intrinsic viscosity of the branched polypropylene and $[IV]_{lin}$ is the intrinsic viscosity of the linear polypropylene having the same weight average molecular weight (within a range of ±10%) as the branched polypropylene. Thereby, a low g'-value is an indicator for a high branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith included by reference. Thus it is preferred that the branching index g' of the high melt strength polypropylene (HMS-PP) shall be less than 1.0, more preferably equal or less than 0.9, like less than 0.8. In another preferred embodiment the branching index g' of the high melt strength polypropylene (HMS-PP) shall be preferably less than 0.7.

The high degree of branching of the high melt strength polypropylene (HMS-PP) contributes also to its melt strength. Accordingly it is preferred that the high melt strength polypropylene (HMS-PP) is further characterized by a strain hardening behavior with a haul-off force $F_{max}$ of at least 10.0 cN and a draw down velocity $v_{max}$ of at least 200 mm/s, more preferably by a strain hardening behavior with a haul-off force $F_{max}$ of at least 20.0 cN and a draw down velocity $v_{max}$ of at least 250 mm/s, yet more preferably by a strain hardening behavior with a haul-off force $F_{max}$ of at least 25.0 cN and a draw down velocity $v_{max}$ of at least 250 mm/s.

Such a high melt strength polypropylene (HMS-PP) is preferably obtained by modifying, i.e. chemically modifying, a polypropylene. Such a modification is necessary to achieve the branching structure and/or the strain hardening phenomena of the high melt strength polypropylene (HMS-PP). Such a modification has also influence on the gel content of the high melt strength polypropylene (HMS-PP). Accordingly it is justified to define the high melt strength polypropylene (HMS-PP) further and/or alternatively by its gel content. Thus it is appreciated that the high melt strength polypropylene (HMS-PP) is featured by a relatively moderate gel content, i.e. of not more than 1.00 wt.-%, even more preferred of not more than 0.80 wt.-%, still more preferred of not more than 0.50 wt.-% determined as the relative amount of polymer insoluble in boiling xylene (xylene hot insoluble fraction, XHI). On the other hand the high melt strength polypropylene (HMS-PP) may show a certain degree of branching and thus a certain amount of gel content, i.e. of at least 0.15 wt.-%, more preferably of at least 0.27 wt.-%. Thus a preferred range for the gel content of the high melt strength polypropylene (HMS-PP) is 0.05 to 0.90 wt.-%, more preferred 0.26 to 0.8 wt.-%.

Additionally it is preferred that in the melt strength polypropylene (HMS-PP) has an $MFR_2$ (230° C.) in a range of 1.0 to 10.0 g/10 min, more preferably of 4.0 to 8.5 g/10 min, still more preferably of 6.0 to 8.0 g/10 min.

Preferably, the high melt strength polypropylene (HMS-PP) has a density of at least 850 kg/m$^3$, more preferably of at least 875 kg/m$^3$ and most preferably of at least 900 kg/m$^3$.

Further, preferably, the high melt strength polypropylene (HMS-PP) has a density of not more than 950 kg/m$^3$, more preferably of not more than 925 kg/m$^3$ and most preferably of not more than 910 kg/m$^3$.

Preferably, the high melt strength polypropylene (HMS-PP) has a melting point of at least 140° C., more preferably of at least 150° C. and most preferably of at least 160° C.

As stated above, the melt strength polypropylene (HMS-PP) is preferably a modified polypropylene. Accordingly the melt strength polypropylene (HMS-PP) can be further defined by the way obtained. Thus the melt strength polypropylene (HMS-PP) is preferably the result of treating an unmodified polypropylene (A) with thermally decomposing radical-forming agents and/or with ionizing radiation. However, in such a case a high risk exists that the polypropylene (A) is degraded, which is detrimental. Thus it is preferred that the modification is accomplished by the use of bifunctionally unsaturated monomer(s) and/or multifunctionally unsaturated low molecular weight polymer(s) as chemically bound bridging unit(s). A suitable method to obtain the melt strength polypropylene (HMS-PP) is for instance disclosed in EP 0 787 750, EP 0 879 830 A1 and EP 0 890 612 A2. All documents are herewith included by reference. Thereby, the amount of peroxide is preferably in the range of 0.05 to 3.00 wt.-% based on the unmodified polypropylene (A).

Accordingly in one preferred embodiment the high melt strength polypropylene (HMS-PP) comprises units derived from
  (i) propylene and
  (ii) bifunctionally unsaturated monomer(s) and/or multifunctionally unsaturated low molecular weight polymer(s).

"Bifunctionally unsaturated or multifunctionally unsaturated" as used above means preferably the presence of two or more non-aromatic double bonds, as in e.g. divinylbenzene or cyclopentadiene or polybutadiene. Only such bi- or multifunctionally unsaturated compounds are used which can be polymerized preferably with the aid of free radicals. The unsaturated sites in the bi- or multifunctionally unsaturated compounds are in their chemically bound state not actually "unsaturated", because the double bonds are each used for a covalent bond to the polymer chains of the polypropylene (A).

Reaction of the bifunctionally unsaturated monomer(s) and/or multifunctionally unsaturated low molecular weight polymer(s), preferably having a number average molecular weight ($M_n$)≤10000 g/mol, synthesized from one and/or more unsaturated monomers with the propylene polymer composition may be performed in the presence of a thermally free radical forming agent, e.g. decomposing free radical-forming agent, like a thermally decomposable peroxide and/or ionizing radiation or microwave radiation.

The bifunctionally unsaturated monomers may be
divinyl compounds, such as divinylaniline, m-divinylbenzene, p-divinylbenzene, divinylpentane and divinylpropane;
allyl compounds, such as allyl acrylate, allyl methacrylate, allyl methyl maleate and allyl vinyl ether;
dienes, such as 1,3-butadiene, chloroprene, cyclohexadiene, cyclopentadiene, 2,3-dimethylbutadiene, heptadiene, hexadiene, isoprene and 1,4-pentadiene;
aromatic and/or aliphatic bis(maleimide) bis(citraconimide) and mixtures of these unsaturated monomers.

Especially preferred bifunctionally unsaturated monomers are 1,3-butadiene, isoprene, dimethyl butadiene and divinylbenzene.

The multifunctionally unsaturated low molecular weight polymer, preferably having a number average molecular weight ($M_n$)≤10000 g/mol may be synthesized from one or more unsaturated monomers.

Examples of such low molecular weight polymers are
polybutadienes, especially where the different microstructures in the polymer chain, i.e. 1,4-cis, 1,4-trans and 1,2-(vinyl) are predominantly in the 1,2-(vinyl) configuration
copolymers of butadiene and styrene having 1,2-(vinyl) in the polymer chain.

A preferred low molecular weight polymer is polybutadiene, in particular a polybutadiene having more than 50.0 wt.-% of the butadiene in the 1,2-(vinyl) configuration.

The high melt strength polypropylene (HMS-PP) may contain more than one bifunctionally unsaturated monomer and/or multifunctionally unsaturated low molecular weight polymer. Even more preferred the amount of bifunctionally unsaturated monomer(s) and multifunctionally unsaturated low molecular weight polymer(s) together in the high melt strength polypropylene (HMS-PP) is 0.01 to 10.0 wt.-% based on said high melt strength polypropylene (HMS-PP).

As stated above it is preferred that the bifunctionally unsaturated monomer(s) and/or multifunctionally unsaturated low molecular weight polymer(s) are used in the presence of a thermally decomposing free radical-forming agent.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:
Acyl peroxides: benzoyl peroxide, 4-chlorobenzoyl peroxide, 3-methoxybenzoyl peroxide and/or methyl benzoyl peroxide.
Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.

Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate.

Or mixtures of these above listed free radical-forming agents.

The unmodified polypropylene (A) to prepare such a high melt strength polypropylene (HMS-PP) has preferably an $MFR_2$ (230° C.) in a range of 0.05 to 45.00 g/10 min. More preferably the $MFR_2$ (230° C.) is in a range of 0.05 to 35.00 g/10 min in case the unmodified polypropylene (A) is a homopolymer. On the other hand the $MFR_2$ (230° C.) is in a range of 0.05 to 45.00 g/10 min in case the unmodified polypropylene (A) is a copolymer.

Preferably the unmodified polypropylene (A) is a homopolymer. The expression homopolymer used in the instant invention relates to a polypropylene that consists substantially, i.e. of more than 99 wt.-%, still more preferably of at least 99.8 wt.-% of propylene units. In a preferred embodiment only propylene units in the propylene homopolymer are detectable. The comonomer content can be determined with FT infrared spectroscopy, as described below in the examples.

Preferably the high melt strength polypropylene (HMS-PP) is produced from the unmodified polypropylene (A) as defined above under process conditions as defined in detail below.

Another essential requirement of the present invention is that polypropylene composition comprises at least one α-nucleating agent (N).

In principle any α-nucleating agent (N) can be used.
Examples of suitable α-nucleating agents (N) are selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene)sorbitol), or substituted nonitol-derivatives, such as 1,2,3,-trideoxy-4,6:5,7-bis-O-[(4-propylphenyl)methylene]-nonitol, and (iii) salts of diesters of phosphoric acid, e.g. sodium 2,2'-methylenebis(4,6,-di-tert-butylphenyl)phosphate or aluminium-hydroxy-bis[2,2'-methylene-bis(4,6-di-t-butylphenyl)phosphate], and (iv) vinylcycloalkane polymer and vinylalkane polymer.

Such additives are generally commercially available and are described, for example, in Gachter/Muller, Plastics Additives Handbook, 4th Edition, Hansa Publishers, Munich, 1993.

The α-nucleating agent (N) content of the polypropylene composition is preferably up to 5 wt.-%. In a preferred embodiment, the polypropylene composition of the present invention contain from 0.0001 to 1.0 wt.-%, preferably from 0.0005 to 0.50 wt.-%, of a α-nucleating agent (N), in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene)sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

The most preferred α-nucleating agents (N) are 1,2,3,-trideoxy-4,6:5,7-bis-O-[(4-propylphenyl)methylene]-nonitol, vinylcycloalkane polymer and vinylalkane polymer. In an specific embodiment the α-nucleating agent (N) is
(a) a vinylcycloalkane polymer and/or a vinylalkane polymer, or
(b) 1,2,3,-trideoxy-4,6:5,7-bis-O-[(4-propylphenyl)methylene]-nonitol and a vinylcycloalkane polymer and/or a vinylalkane polymer.

In case the α-nucleating agents (N) are polymeric α-nucleating agents selected from the group consisting of vinylcycloalkane polymers and vinylalkane polymers, these polymeric nucleating agents are either accomplished by a special reactor technique, where the catalyst is prepolymerised with monomers like e.g. vinylcyclohexane (VCH), or by blending the polypropylene composition with the vinylcycloalkane polymer or vinylalkane polymer. These methods are described in greater detail in e.g. EP 0 316 187 A2 and WO 99/24479. In a preferred embodiment the polymeric nucleating agent (N) is introduced into the propylene copolymer (C-PP) by blending or even more preferred by the specific reactor technique as defined below. Accordingly in one embodiment of the present invention the α-nucleating agent (N) is introduced into the instant polypropylene composition as part of the propylene copolymer (C-PP).

To obtain especially good results the required components as defined above may be present in specific amounts within the new polypropylene composition. Thus it is preferred that the polypropylene composition according to the instant invention comprises
(a) 70.0 to 95.0 wt.-%, preferably 75.0 to 93.0 wt.-%, of the propylene copolymer (C—PP), and
(b) 5.0 to 20.0 wt.-%, more preferably 6.0 to 15.0 wt.-%, of the high melt strength polypropylene (HMS-PP), and
(c) 0.0001 to 5.0 wt.-%, more preferably 0.0005 to 1.0 wt.-%, of the α-nucleating agent (N),
based on the total polypropylene composition.

The polypropylene composition of the present invention may comprise further components. However, it is preferred that the polypropylene composition comprises as polymer components only the propylene copolymer (C-PP) and the high melt strength polypropylene (HMS-PP) as defined above. Accordingly the amounts of the propylene copolymer (C-PP), the high melt strength polypropylene (HMS-PP) and the α-nucleating agent (N) may not result in 100 wt.-% based on the total polypropylene composition. Thus the remaining part up 100.0 wt.-% may be accomplished by further additives known in the art. However, this remaining part shall be not more than 10.0 wt.-%, preferably not more than 2.0 wt %, within the total composition. For instance the inventive polypropylene composition may comprise additionally small amounts of stabilizers, acid scavengers, lubricants and mold release agents, nucleating agents, antistatics, plasticizers, dyes or pigments. In general, these are incorporated during pelletization of the pulverulent product obtained in the polymerization.

The present invention is also directed to the use of the above defined polypropylene composition. Accordingly the polypropylene composition as defined in the instant invention is used for the preparation of molded products, like extrusion blown molded products. More particularly the present invention is directed to the use of the polypropylene composition of the instant invention to improve the impact performance (drop test) by keeping the gloss on a high level of extrusion blown molded articles, like extrusion blown molded bottles, made out of said polypropylene composition compared to conventional extrusion blown molded bottles, in particular compared to extrusion blown molded bottles made out of the comparative examples CE1 and CE2, respectively.

Further the present invention is directed to molded articles, like extrusion blown molded articles, comprising, preferably comprising at least 90 wt.-%, more preferably consisting of, a polypropylene composition according to this invention. More particularly the present invention is directed to bottles produced by an extrusion blown process comprising, preferably comprising at least 90 wt.-%, more preferably consisting of, a polypropylene composition according to this invention.

In the following the preparation of the inventive polypropylene composition is described in more detail.

The individual components used for the inventive polypropylene composition are known by the person skilled in the art and thus can be readily produced by the information provided herein.

For instance the propylene copolymer (C-PP) as defined in the instant invention may be prepared by polymerizing, in a slurry reactor, for example a loop reactor, propylene optionally together with at least another $C_2$ to $C_{12}$ α-olefin (comonomers), in the presence of a polymerization catalyst to produce a part of the propylene copolymer (C-PP). This part is then transferred to a subsequent gas phase reactor, wherein in the gas phase reactor propylene is reacted in the presence of suitably selected other $C_2$ to $C_{12}$ α-olefin(s) (comonomers) in order to produce a further part in the presence of the reaction product of the first step. This reaction sequence provides a reactor blend of parts (i) (fraction (A)) and (ii) (fraction (B)) constituting a propylene copolymer (C-PP). It is of course possible by the present invention that the first reaction is carried out in a gas phase reactor while the second polymerization reaction is carried out in a slurry reactor, for example a loop reactor. It is furthermore also possible to reverse the order of producing parts (i) and (ii), which has been described above in the order of first producing part (i) and then producing part (ii). The above-discussed process, comprising at least two polymerization steps, is advantageous in view of the fact that it provides easily controllable reaction steps enabling the preparation of a desired reactor blend. The polymerization steps may be adjusted, for example by appropriately selecting monomer feed, comonomer feed, hydrogen feed, temperature and pressure in order to suitably adjust the properties of the polymerization products obtained. It is in particular possible to obtain a multimodality, preferably the bimodality, of the propylene copolymer (C-PP), with respect to the comonomer, like ethylene, distribution as well as with respect to the molecular weights and MFR$_2$ (230° C.) values during said multistage polymerization procedures.

Such a process can be carried out using any suitable catalyst for the preparation of the propylene copolymer (C-PP). Preferably, the process as discussed above is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl based compound. Suitable catalysts are in particular disclosed in U.S. Pat. No. 5,234,879, WO 92/19653, WO 92/19658 and WO 99/33843.

Preferred external donors are the known silane-based donors, such as dicyclopentyl dimethoxy silane or cyclohexyl methyldimethoxy silane.

One embodiment of a process as discussed above is a loop-gas phase process, such as developed by Borealis, known as Borstar® technology, described for example in EP 0 887 379 A1 and WO 92/12182.

With respect to the above-mentioned preferred slurry-gas phase process, the following general information can be provided with respect to the process conditions.

Temperature of from 40 to 110° C., preferably between 60 and 100° C., in particular between 80 and 90° C., with a pressure in the range of from 20 to 80 bar, preferably 30 to 60 bar, with the option of adding hydrogen in order to control the molecular weight. The reaction product of the slurry polymerization, which preferably is carried out in a loop reactor, is then transferred to the subsequent gas phase reactor, wherein the temperature preferably is within the range of from 50 to 130° C., more preferably 80 to 100° C., at a pressure in the range of from 5 to 50 bar, preferably 15 to 35 bar, again with the option of adding hydrogen in order to control the molecular weight.

The residence time can vary in the reactor zones identified above. In embodiments, the residence time in the slurry reaction, for example the loop reactor, is in the range of from 0.5 to 5 hours, for example 0.5 to 2 hours, while the residence time in the gas phase reactor generally will be from 1 to 8 hours.

The properties of the random propylene copolymer (C-PP) produced with the above-outlined process may be adjusted and controlled with the process conditions as known to the skilled person, for example by one or more of the following process parameters: temperature, hydrogen feed, comonomer feed, propylene feed, catalyst, type and amount of external donor, split between two or more components of a multimodal polymer.

The high melt strength polypropylene (HMS-PP) is preferably obtained by a process as described in EP 0 879 830 A1 and EP 0 890 612 A2. Both documents are herewith included by reference. Accordingly the high melt strength polypropylene (HMS-PP) is produced by
(a) mixing
  (i) a unmodified propylene homopolymer and/or copolymer (A) as defined above, preferably a unmodified propylene homopolymer with a weight average molecular weight (M$_w$) of 500,000 to 1,500,000 g/mol,
  (ii) from 0.05 to 3 wt.-% based on the components of (i) and (ii), of a peroxide selected from the group consisting of acyl peroxide, alkyl peroxide, hydroperoxide, perester and peroxycarbonate, and
  (iii) optionally diluted with inert solvents,
(b) heating to 30 to 100° C., preferably to 60 to 90° C.,
(c) sorption of volatile bifunctional monomers, preferably ethylenically unsaturated, multifunctional monomers, like C$_4$ to C$_{10}$ dienes and/or C$_7$ to C$_{10}$ divinyl compounds, by the unmodified propylene homopolymer and/or copolymer (A), preferably unmodified propylene homopolymer (A), from the gas phase at a temperature of from 20 to 120° C., preferably of from 60 to 100° C., where the amount of the absorbed bifunctionally unsaturated monomers is from 0.01 to 10.00 wt.-%, preferably from 0.05 to 2.00 wt.-%, based on the propylene homopolymer (A),
(d) heating and melting the polypropylene composition in an atmosphere comprising inert gas and/or the volatile bifunctional monomers, from sorption temperature to 210° C., whereupon the free-radical generators are decomposed and then
(e) heating the melt up to 280° C. in order to remove unreacted monomers and decomposition products, and
(f) pelletitzing the melt.

The process for producing the high melt strength polypropylene (HMS-PP) preferably is a continuous method, performed in continuous reactors, mixers, kneaders and extruders. Batchwise production of the high melt strength polypropylene (HMS-PP), however is feasible as well.

Practical sorption times τ of the volatile bifunctional monomers range from 10 to 1000 s, where sorption times τ of 60 to 600 are preferred.

Further, the polymer composition in accordance with the present invention may be prepared by compounding the components within suitable melt mixing devices for preparing polymeric compounds, including in particular extruders single screw extruders as well as twin screw extruders. Other suitable melt mixing devices include planet extruders and single screw co-kneaders. Especially preferred are twin screw extruders including high intensity mixing and kneading sections. Suitable melt temperatures for preparing the compositions are in the range from 170 to 300° C., preferably in the range from 200 to 260° C., and at a throughput of 10 to 500 kg/h and a screw speed of 50 to 200 rpm.

As already identified above, the polypropylene composition or the propylene copolymer (C-PP) in accordance with the present invention is subjected a visbreaking step. The visbreaking may be carried out in any known manner, but typically the present invention envisages chemical visbreaking using a peroxide visbreaking agent. Typical visbreaking agents are 2,5-dimethyl-2,5-bis(tert.butyl-peroxy)hexane (DHBP) (for instance sold under the tradenames Luperox 101 and Trigonox 101), 2,5-dimethyl-2,5-bis(tert.butyl-peroxy) hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis(tert.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of polypropylene composition and/or random propylene copolymer (C-PP) to be subjected to visbreaking, the MFR$_2$ (230° C.) value of the polypropylene composition and/or the propylene copolymer (C-PP) to be subjected to visbreaking and the desired target MFR$_2$ (230° C.) of the product to be obtained. Accordingly, typical amounts of peroxide visbreaking agent are from 0.005 to 0.5 wt.-%, more preferably from 0.01 to 0.2 wt.-%, based on the amount of propylene polymer employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting in an overall decrease of the average molecular weight and an increase in melt flow rate.

For the preparation of extrusion molded articles an extrusion blown process as known in the art is applied. For instance, for the production of 1 liter round bottles like used for testing in the inventive work a "Fischer Müller" Blow Molding Machine may be used. The main processing parameters for the production are as follows:
Temperature profile: 180 to 190° C. applied in extruder, adapter and head
Melt temperature measured: 180 to 190° C.
Speed of extruder (revolution per minute; rpm): 11 to 14 rpm
Die gap: the die gap was adjusted to get a bottle with a weight of 40 g with Borealis grade RB307MO
Cycle time: 12 to 16 seconds
The present invention will now be described in further detail by the examples provided below.

EXAMPLES

1. Definitions/Measuring Methods

The following definitions of terms and determination methods apply for the above general description of the invention as well as to the below examples unless otherwise defined.
NMR-Spectroscopy Measurements:
The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the triad analysis the assignment is done according to the methods described in literature: (T. Hayashi, Y. Inoue, R. Chüjö, and T. Asakura, Polymer 29 138-43 (1988). and Chujo R, et al, Polymer 35 339 (1994).

The NMR-measurement was used for determining the mm triad concentration in a manner well known in the art.

Melting temperature Tm, crystallization temperature Tc, and the degree of crystallinity: measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.
Randomness In the FTIR measurements, films of 250-mm thickness were compression moulded at 225° C. and investigated on a Perkin-Elmer System 2000 FTIR instrument. The ethylene peak area (760-700 cm$^{-1}$) was used as a measure of total ethylene content. The absorption band for the structure -P-E-P- (one ethylene unit between propylene units), occurs at 733 cm$^{-1}$. This band characterizes the random ethylene content. For longer ethylene sequences (more than two units), an absorption band occurs at 720 cm$^{-1}$. Generally, a shoulder corresponding to longer ethylene runs is observed for the random copolymers. The calibration for total ethylene content based on the area and random ethylene (PEP) content based on peak height at 733 cm$^{-1}$ was made by $^{13}$C$^-$NMR. (Thermochimica Acta, 66 (1990) 53-68).

Randomness=random ethylene(-P-E-P-)content/the total ethylene content×100%.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

MFR$_2$ (230° C.) is measured according to ISO 1133 (230° C., 2.16 kg load)

Ethylene content is measured with Fourier transform infrared spectroscopy (FTIR) calibrated with $^{13}$C-NMR. When measuring the ethylene content in polypropylene, a thin film of the sample (thickness about 250 mm) was prepared by hot-pressing. The area of absorption peaks 720 and 733 cm$^{-1}$ was measured with Perkin Elmer FTIR 1600 spectrometer. The method was calibrated by ethylene content data measured by $^{13}$C-NMR. Content of any one of the C4 to C20 α-olefins is determined with $^{13}$C-NMR; literature: "IR-Spektroskopie für Anwender"; WILEY-VCH, 1997 and "Validierung in der Analytik", WILEY-VCH, 1997

Calculation of comonomer content of the second propylene copolymer fraction (B):

$$\frac{C(C) - w(A)xC(A)}{w(B)} = C(B)$$

wherein
w(A) is the weight fraction of the first propylene copolymer fraction (A), i.e. the product of the first reactor,
w(B) is the weight fraction of the second propylene copolymer fraction (B), i.e. of the polymer produced in the second reactor,
C(A) is the comonomer content [in wt.-%] measured by Fourier transform infrared spectroscopy (FTIR) of the first propylene copolymer fraction (A), i.e. of the product of the first reactor,
C(C) is the comonomer content [in wt.-%] measured by Fourier transform infrared spectroscopy (FTIR) of the product obtained after the second reactor, i.e. the propylene copolymer (C-PP)
C(B) is the calculated comonomer content [in wt.-%] of the second propylene copolymer fraction (B).

The xylene cold solubles (XCS, wt.-%): Content of xylene cold solubles (XCS) is determined at 23° C. according ISO 6427.

The gel content is assumed to be identical to the xylene hot insoluble (XHI) fraction, which is determined by extracting 1 g of finely cut polymer sample with 350 ml xylene in a Soxhlet extractor for 48 hours at the boiling temperature. The remaining solid amount is dried at 90° C. and weighed for determining the insolubles amount.
Strain Hardening Behaviour (Melt Strength):

The strain hardening behaviour is determined by the method as described in the article "Rheotens-Mastercurves and Drawability of Polymer Melts", M. H. Wagner, Polymer Engineering and Sience, MID-APRIL 1SW, Vol. 36, NO. 7, pages 925 to 935. The content of the document is included by reference.

For detailed explanation of the measuring method it is also referred to the FIG. 1.

FIG. 1 shows a schematic representation of the experimental procedure which is used to determine strain hardening.

The strain hardening behaviour of polymers is analysed by Rheotens apparatus (1) (product of Göttfert, Siemensstr. 2, 74711 Buchen, Germany) in which a melt strand (2) is elongated by drawing down with a defined acceleration. The haul-off force F in dependence of draw-down velocity v is recorded.

The test procedure is performed in a standard conditioned room with controlled room temperature of 23° C. and 1 atm. The Rheotens apparatus (1) is combined with an extruder/melt pump (3) for continuous feeding of the melt strand (2). The extrusion temperature is 200° C.; a capillary die with a diameter of 2 mm and a length of 6 mm is used. The strength length between the capillary die and the Rheotens wheels is 80 mm. At the beginning of the experiment, the take-up speed of the Rheotens wheels was adjusted to the velocity of the extruded polymer strand (tensile force zero): Then the experiment was started by slowly increasing the take-up speed of the Rheotens wheels until the polymer filament breaks. The acceleration of the wheels was small enough so that the tensile force was measured under quasi-steady conditions. The acceleration of the melt strand (2) drawn down is 120 mm/sec$^2$.

The Rheotens was operated in combination with the PC program EXTENS. This is a real-time data-acquisition program, which displays and stores the measured data of tensile force and drawdown speed.

The schematic diagram in FIG. 1 shows in an exemplary fashion the measured increase in haul-off force F (i.e. "melt strength") versus the increase in draw-down velocity v (i.e. "drawability").

Description/Dimension of the Bottles 1 l bottles, having an outer diameter of 90 mm, wall thickness: 0.6 mm; overall-height of 204 mm, height of the cylindrical mantle of 185 mm Drop Test on Bottles The drop test is performed on extrusion blow moulded 1 l bottles, having an outer diameter of 90 mm, wall thickness: 0.6 mm; overall-height of 204 mm, height of the cylindrical mantle of 185 mm.

The bottles are filled up to their shoulder with water.

During a pre-test the estimated falling height is determined on 10 bottles.

The final test is to be performed on 20 bottles, starting at the pre-determined falling height.

For each run 2 bottles are dropped.

Depending on 2 breaks or 1 break/1 no-break (=neutral) or 2 no-breaks, the next dropping height is chosen to be lower/same/higher for the next round.

The increase or decrease in height is 0.25 m, only at dropping heights <1.5 m the increase or decrease is 0.1 m.

The final drop height is determined depending on the falling heights of the containers after the first change in trend or after the first "neutral" result according following formula:

$$h_e = \Sigma(n_i \cdot h_i)/n_g$$

wherein
$h_e$=50% drop height
$h_i$=drop height
$n_i$=number of containers dropped at the respective height
$n_g$=total number of dropped containers Transparency, Clarity and Haze Measurement on Bottles
Instrument: Haze-gard plus from BYK-Gardner
Testing: according to ASTM D1003 (as for injection molded plates)
The bottles: It is measured on the outer wall of the bottles. The top and bottom of the bottles is cut off. This round wall is then split in two, horizontally. Then the haze measurement and the wall thickness are done in six places around this wall, close to the middle. Then the haze value is reported as average of this six parallels.

Tensile Test on Bottles

The top and bottom of the bottles is cut off 12 specimen according to ISO527/1B are punched along the remaining cylinder. Tensile modulus and yield strength are then determined according ISO 527-2, applying a traction speed of 1 mm/min for the modulus and 100 mm/min for yield strength.

Gloss Measurement on Bottles
Instrument: Sceen TRI-MICROGLOSS 20-60-80 from BYK-Gardner
Testing: ASTM D 2457 (as for injection molded plates)
The bottles:
It is measured on the wall of the bottles. The top and bottom of the bottles is cut off. This round wall is then split in two, horizontally. Then this wall is cut into six equal samples of app. 90×90 mm, just to fit into a special light trap made for testing on injection molded parts. Then the gloss at 60° is measured on these six samples, and the average value is reported as gloss at 60°.

2. Preparation of the Examples

The compositions PP1 and PP2 have been produced in a Borstar™-type two-step polymerization process starting in a prepolymerization reactor, followed by polymerization in a bulk-phase loop reactor, again followed by polymerization in a gas phase reactor, varying the molecular weight and ethylene content by appropriate hydrogen and comonomer feeds. The catalyst used in the polymerization process was the commercial BCF20P catalyst (1.9 wt.-% Ti-Ziegler-Natta-catalyst as described in EP 591 224) of Borealis with triethylaluminium (TEA) as co-catalyst and dicyclo pentyl dimethoxy silane (donor "D") as donor. Before the polymerization, the catalyst was prepolymerized with vinyl cyclohexane in an amount to achieve a concentration of 200 ppm poly(vinyl cyclohexane) (PVCH) in the final polymer. The respective process is described in EP 1 028 984 and EP 1 183 307. The prepolymeritsation with propylene was performed in a stirred tank reactor in liquid phase. Following a transfer to the loop reactor, the first copolymer fraction (A) was produced with the parameters in the upper part of table 1, then the polymer was again transferred to the gas phase reactor and the second copolymer fraction (B) was produced with the parameters in the lower part of table 1. An additive combination of 2000 ppm of Irganox B 225 (supplied by Ciba Specialty Chemicals, a blend of 50% Irganox 1010, Pentaerythrityl-tetrakis(3-(3',5'-di-tert. butyl-4-hydroxyphenyl)-propionate, CAS-no. 6683-19-8 and 50% Irgafos 168, Tris(2,4-di-t-butylphenyl) phosphate, CAS-no. 31570-04-4) and 500 ppm of calcium stearate (supplied by Croda Polymer Additives, CAS-no. 1592-23-0) was used. Both compositions were homogenized and pelletized in a co-rotating twin-screw extruder with said additives at 200 to 230° C.

TABLE 1

| Polymerization conditions | | | |
|---|---|---|---|
| | | PP1 | PP2 |
| Composition | | | |
| Catalyst feed | [g/h] | 1.02 | 0.93 |
| Al/Ti ratio | [mol/mol] | 663 | 725 |
| Al/donor ratio | [mol/mol] | 5.5 | 5.0 |
| Prepolymerization | | | |
| Temperature | [° C.] | 35 | 35 |
| Pressure | [kPa] | 4700 | 4700 |
| Residence time | [h] | 0.34 | 0.34 |
| Loop reactor | | | |
| Temperature | [° C.] | 70 | 68 |
| Pressure | [kPa] | 4990 | 4970 |
| $H_2/C_3$ ratio | [mol/kmol] | 1.9 | 2.2 |
| $C_2/C_3$ ratio | [mol/kmol] | 6.0 | 8.4 |
| Residence time | [h] | 0.50 | 0.49 |
| Production rate | [kg/h] | 32.9 | 32.6 |

TABLE 1-continued

Polymerization conditions

|  |  | PP1 | PP2 |
|---|---|---|---|
| Gas phase reactor |  |  |  |
| Temperature | [° C.] | 70 | 70 |
| Pressure | [kPa] | 2120 | 2160 |
| $H_2/C_3$ ratio | [mol/kmol] | n.d. | n.d. |
| $C_2/C_3$ ratio | [mol/kmol] | 56 | 38 |
| Residence time | [h] | 0.87 | 0.91 |
| Production rate | [kg/h] | 21.5 | 19.8 |

TABLE 2

Properties of the propylene copolymer (C-PP)

|  |  | PP1 | PP2 | CE 1 | CE 2 |
|---|---|---|---|---|---|
| Loop |  |  |  |  |  |
| split | [wt.-%] | 58 | 59 | 100 | 100 |
| $MFR_2$ | [g/10 min] | 2.3 | 2.0 | 1.3 | 2.0 |
| C2 | [wt.-%] | 2.1 | 3.1- | 4.1 | 3.2 |
| XS | [wt.-%] | 3.1 | 3.3 | 7.2 | 4.8 |
| GPR |  |  |  |  |  |
| split | [wt.-%] | 42 | 41 |  |  |
| $MFR_2$ | [g/10 min] | 1,.5 | 1.6 |  |  |
| C2 | [wt.-%] | 4.2 | 3.9 |  |  |
| XS | [wt.-%] | 8.4 | 6.2 |  |  |
| Tm | [° C.] | 151 | 148 |  |  |
| Tc | [° C.] | 119 | 116 |  |  |
| Randomness | [%] | 69.7 | 70.2 |  |  |
| Melt strength* | [cN] | 9.3 | 9.2 |  |  |

*at a maximum speed of 204 mm/s

The components were blended according to Table 3. For stabilization of the materials a conventional additive package has been used like 0.2 wt % Irganox B225 (antioxidant masterbatch supplied by Ciba Specialty Chemicals, Switzerland) and 0.05 wt % Ca-Stearate (CAS-No. 1592-23-0). For the visbreaking step peroxide initiator (Trigonox 101, supplied by Akzo Nobel) was dosed in an amount of 0.006 wt.-% and 0.007 wt.-%, respectively. Blending took place in a twin screw extruder (PRISM TSE24 L/D ratio 40) with two high intensity mixing segments at temperatures between 190 and 240° C. at a throughput of 10 kg/h and a screw speed of 50 rpm. The material was extruded to two circular dies of 3 mm diameter into a water bath for strand solidification and then pelletized and dried. For the production of 1 liter round bottles like used for testing in the inventive work a "Fischer Müller" Blow Molding Machine was used. The main processing parameters for the production are as follows:

Temperature profile: 180 to 190° C. applied in extruder, adapter and head

Melt temperature measured: 180 to 190° C.

Speed of extruder (revolution per minute; rpm): 11 to 14 rpm

Die gap: the die gap was adjusted to get a bottle with a weight of 40 g with Borealis grade RB307MO Cycle time: 12 to 16 seconds

TABLE 3

Properties of the polypropylene bottles, produced out of inventive and comparative example-materials (at 190° C.)

|  | PP1 [g] | PP2 [g] | HMS [g] | α [g] | $MFR_2$ g/10 min | Modulus [%] | Gloss [%] | Clarity [%] | Transparency [%] | Drop test [m] |
|---|---|---|---|---|---|---|---|---|---|---|
| IE 1 | 84.6 | — | 15.0 | 0.4 | 3.0 | 1078 | 41 | 74 | 90 | 3.4 |
| IE 2 | — | 84.6 | 15.0 | 0.4 | 3.2 | 1093 | 40 | 76 | 91 | 2.9 |
| IE 3 | 85.0 | — | 15.0 | — | 3.1 | 1041 | 32 | 79 | 91 | 3.1 |
| IE 4 | — | 85.0 | 15.0 | — | 3.2 | 1075 | 32 | 77 | 91 | 2.7 |
| CE 1 | — | — | — | — | 1.5 | 900 | 20 | 74 | 92 | 2.5 |
| CE 2 | — | — | — | — | 1.9 | 1125 | 11 | 76 | 90 | 2.0 |

"RB307MO": is the commercial random propylene ethylene copolymer of Borealis with an ethylene content of 3.9 wt.-%, an $MFR_2$ (230° C.) of 1.5 g/10 min, and xylene cold soluble fraction (XCS) of 7.0 wt.-%.
HMS: is the commercial high melt strength polypropylene Daploy ™ WB180HMS of Borealis based on a propylene homopolymer, wherein the high melt strength polypropylene Daploy ™ WB180HMS has a density of 905 kg/m³, a melting point of 165° C., an $MFR_2$ (230° C.) of 6.0 g/10 min, a melt strength of 11.5 cN at a maximum speed of 242 mm/s, a xylene cold soluble fraction (XCS) of 2.5 wt.-% and a branching index g' of 0.64.
α: is the commercial α-nucleating agent Millad NX 8000 (1,2,3,-trideoxy-4,6:5,7-bis-O-[(4-propylphenyl)methylene]-nonitol)

We claim:

1. A polypropylene composition comprising a melt flow rate $MFR_2$ (230° C.) measured according to ISO 1133 of at least 2.0 g/10 min, said polypropylene composition comprising a propylene copolymer (C-PP), a high melt strength polypropylene (HMS-PP), and an α-nucleating agent (N), wherein the propylene copolymer (C-PP)
    (a) has a comonomer content of equal to or below 7.0 wt.-%, the comonomers are ethylene and/or at least one $C_4$ to $C_{12}$ α-olefin,
    (b) comprises two propylene copolymer fractions (A) and (B), wherein the comonomer content of the first propylene copolymer fraction (A) is in the range of 1.0 to 4.5 wt.-% and the comonomer content of the first propylene copolymer fraction (A) is lower compared to the comonomer content of the second propylene copolymer fraction (B).

2. A polypropylene composition according to claim 1, wherein the propylene copolymer (C-PP) fulfills the equation (I)

$$R+4.96 \times C \leq 95.66 \quad (I)$$

wherein
R is the randomness [%] measured by Fourier transform infrared spectroscopy (FTIR), and
C is the comonomer content [wt.-%] measured by Fourier transform infrared spectroscopy (FTIR).

3. A polypropylene composition according to claim 1, wherein (a) the weight ratio between the first propylene copolymer fraction (A) and the second propylene copolymer fraction (B) is 40:60 to 60:40, and/or (b) the comonomer content of the second propylene copolymer fraction (B) is in the range of 3.0 to 10.0 wt.-%.

4. A polypropylene composition according to claim 1, wherein the propylene copolymer (C-PP)

(a) has a crystallization temperature Tc measured by differential scanning calorimetry (DSC) of at least 110° C., and/or (b) is α-nucleated.

5. A polypropylene composition according to claim 1, wherein the propylene copolymer (C-PP) has (a) a comonomer content in the range of 1.5 to 7.0 wt.-%, and/or (b) a melt flow rate $MFR_2$ (230° C.) measured according to ISO 1133 of not more than 4.5 g/10 min, and/or (c) a xylene cold soluble fraction (XCS) of not more than 15.0 wt.-%.

6. A polypropylene composition according to claim 1, wherein the high melt strength polypropylene (HMS-PP) has (a) a strain hardening behavior with a haul-off force $F_{max}$ of at least 10.0 cN and a draw down velocity $V_{max}$ of at least 200 mm/s, and/or (b) a branching index g' of less than 1.0.

7. A polypropylene composition according to claim 1, wherein the high melt strength polypropylene (HMS-PP)

(a) comprises units derived from (i) propylene and (ii) bifunctionally unsaturated monomer(s) and/or multifunctionally unsaturated low molecular weight polymer(s), and/or (b) has a xylene hot insoluble fraction (XHI) of not more than 1.0 wt.-%, and/or (c) has a melt flow rate $MFR_2$ (230° C.) measured according to ISO 1133 of 1.0 to 10.0 g/10 min.

8. A polypropylene composition according to claim 1, wherein the polypropylene composition has (a) a strain hardening behavior with a haul-off force $F_{max}$ of at least 7.0 cN and a draw down velocity $V_{max}$ of at least 180 mm/s, and/or (b) an xylene hot insoluble fraction (XHI) of not more than 1.0 wt.-%, and/or (c) a xylene cold soluble fraction (XCS) of not more than 15.0 wt.-%.

9. A polypropylene composition according to claim 1, wherein the polypropylene composition has been visbroken and the visbroking ratio (final $MFR_2$ (230° C.)/initial $MFR_2$ (230° C.)) is 1.3 to 3.0.

10. A polypropylene composition according to claim 1, wherein the polypropylene composition comprises (a) 70.0 to 95.0 wt.-% the propylene copolymer (C-PP), (b) 5.0 to 20.0 wt.-% of the high melt strength polypropylene (HMS-PP), and (c) 0.0001 to 5.0 wt.-% of the α-nucleating agent (N), based on the total polypropylene composition.

11. A polypropylene composition according to claim 1, wherein the α-nucleating agent (N) is selected from the group consisting of (i) salts of monocarboxylic acids and polycarboxylic acids, and (ii) dibenzylidenesorbitol and $C_1$-$C_8$-alkyl-substituted dibenzylidenesorbitol derivatives, and (iii) salts of diesters of phosphoric acid, (iv) vinylcycloalkane polymer and vinylalkane polymer, and (v) mixtures thereof.

12. A polypropylene composition according to claim 1, wherein the polypropylene composition is used for the preparation of a molded article comprising the polypropylene composition.

13. A polypropylene composition according to claim 1 wherein the polypropylene composition is used for the preparation of an extrusion blown molded article comprising the polypropylene composition.

14. A polypropylene composition comprising a melt flow rate $MFR_2$ (230° C.) measured according to ISO 1133 of at least 2.0 g/10 min, said polypropylene composition comprising a propylene copolymer (C-PP), a high melt strength polypropylene (HMS-PP), and an α-nucleating agent (N), wherein the propylene copolymer (C-PP)

(a) has a comonomer content of equal to or below 7.0 wt.-%, the comonomers are ethylene and/or at least one $C_4$ to $C_{12}$ α-olefin, and (b) fulfills the equation (I)

wherein

R is the randomness [%] measured by Fourier transform infrared spectroscopy (FTIR), and C is the comonomer content [wt.-%] measured by Fourier transform infrared spectroscopy (FTIR).

15. A polypropylene composition according to claim 14, wherein the propylene copolymer (C-PP) comprises two propylene copolymer fractions (A) and (B), wherein the comonomer content of the first propylene copolymer fraction (A) is in the range of 1.0 to 4.5 wt.-% and the comonomer content of the first propylene copolymer fraction (A) is lower compared to the comonomer content of the second propylene copolymer fraction (B).

16. Molded article, comprising a polypropylene composition, comprising a melt flow rate $MFR_2$ (230° C.) measured according to ISO 1133 of at least 2.0 g/10 min, said polypropylene composition comprising a propylene copolymer (C-PP), a high melt strength polypropylene (HMS-PP), and an α-nucleating agent (N), wherein the propylene copolymer (C-PP)

(c) has a comonomer content of equal to or below 7.0 wt.-%, the comonomers are ethylene and/or at least one $C_4$ to $C_{12}$ α-olefin (d) comprises two propylene copolymer fractions (A) and (B), wherein the comonomer content of the first propylene copolymer fraction (A) is in the range of 1.0 to 4.5 wt.-% and the comonomer content of the first propylene copolymer fraction (A) is lower compared to the comonomer content of the second propylene copolymer fraction (B).

17. Molded article according to claim 16, wherein the molded article is a bottle.

18. Molded article according to claim 16, wherein the molded article is an extrusion blown molded article.

* * * * *